US005174545A

United States Patent [19]

Blais

[11] Patent Number: 5,174,545
[45] Date of Patent: Dec. 29, 1992

[54] CONTAMINATION RESISTANT BLEED VALVE

[75] Inventor: Daniel Blais, St.-Hilaire, Canada

[73] Assignee: Pratt & Whitney Canada, Inc., Longueuil, Canada

[21] Appl. No.: 765,727

[22] Filed: Sep. 26, 1991

[51] Int. Cl.⁵ .......................................... F16K 31/122
[52] U.S. Cl. ....................................... 251/43; 251/33; 251/63; 417/27
[58] Field of Search ................. 251/33, 43, 63; 415/27

[56] References Cited

U.S. PATENT DOCUMENTS

| 2,147,722 | 2/1939 | Stern. | |
|---|---|---|---|
| 3,022,040 | 3/1962 | Miller | 251/63 |
| 3,026,896 | 3/1962 | Bosworth | 251/63 X |
| 3,071,345 | 1/1963 | Glenn et al. | |
| 3,265,350 | 8/1966 | Yount et al. | 251/33 X |
| 3,915,587 | 10/1975 | Rannenberg | 415/27 |
| 4,574,585 | 3/1986 | Conn | 415/27 X |
| 4,590,754 | 5/1986 | Blizzard | 60/39.29 X |

Primary Examiner—Gerald A. Michalsky
Attorney, Agent, or Firm—Troxell K. Snyder

[57] ABSTRACT

A bleed valve (20) includes a reciprocating sliding element (42) with a circular head (48) joined to an annular wall (50). An annular first chamber (52) defined by the wall (50), the head (48), and the central support (30) has a variable volume dependent upon the relative position of the sliding element (42). The valve (20) includes a housing (22) having a base (26) with first and second annular partitions (62,64) protruding from the base (26). An annular second chamber (66) is defined by the first partition (62), the platform (34) of the central support (30), the second partition (64), and the base (26). An opening (72) in the central support (30) connects the second chamber (66) in fluid communication to the first chamber (52). Control air supplied from an engine source flows through a first bore (78) into the second chamber (66) which is vented to ambient via a second bore (80). The first and second bores (78,80) have a primary and secondary metering orifice (84,86).

3 Claims, 1 Drawing Sheet

CONTAMINATION RESISTANT BLEED VALVE

DESCRIPTION

1. Technical Field

This invention relates to a bleed valve for a gas turbine engine, and more particularly to a sleeve type bleed valve for a gas turbine engine.

2. Background Art

A gas turbine engine typically uses a valve to bleed compressor air from the engine as an air source for accessories such as starters and pneumatic valves.

A sleeve type valve is commonly used to bleed compressor air from the engine. The conventional sleeve type valve includes a housing having a cylindrical wall joined to a base and further to a cover. An annular sliding element reciprocates along a guide post that is integrated to the base. An annular chamber defined by the wall, the base, and the sliding element has a variable volume dependent upon the relative position of the sliding element to the base. The valve is closed by moving the sliding element into contact with the valve cover. The valve is opened by moving the sliding element toward the base, which allows bleed air from the compressor to flow through an opening in the cover past the sliding element and through a cutout in the wall of the housing.

The position of the sliding element along the guide post controls the flow rate of air through the valve. The movement of the sliding element is dependent upon the pressure differential between the bleed air and the air pressure in the annular chamber. Bleed air from the compressor pushes the sliding element toward the base of the housing, thereby keeping the valve open. The air pressure in the chamber forces the sliding element to mate with the cover, thereby cutting off the flow of bleed air through the valve. Control air from an outside source flows through a passageway in the housing into the annular chamber. The control air pressure is varied to control the movement of the sliding element, thereby controlling the flow rate of air through the valve.

The performance of the conventional sleeve type bleed valve suffers due to contaminates present in the control air and bleed air. When the valve is open, contamination present in the bleed air settles on the surfaces of the sliding element and wall outside the chamber, which causes the seal between the sliding element and the casing to break down. When the valve is being closed, contamination present in the control air settles onto the surfaces of the sliding element and wall within the chamber, which causes the seal between the sliding element and wall to break down. The breaking down of these seals causes the conventional sleeve type bleed valve to fail.

DISCLOSURE OF THE INVENTION

An object of the present invention is to provide a contamination resistant sleeve type bleed valve for a gas turbine engine.

According to the present invention, a sleeve type bleed valve is provided having a housing with a cylindrical body joined to a circular base and further to a circular cover. The base is mated to a stationary central support. The central support includes a plug joined to a circular platform which is joined further to an annular branch having an annular end. A guide column is integrated to the central support to provide a reciprocating axis for a sliding element, which slides along the guide column. The sliding element has a circular head joined to an annular wall. A first annular chamber defined by the wall, the head, and the central support has a variable volume dependent upon the relative position of the sliding element to the central support. An annular sliding seal seated in a groove on a first surface of the end of the central support facing radially outward with respect to the reciprocating axis interfaces with a second surface of the wall of the sliding element facing radially inward with respect to the reciprocating axis to seal the first chamber.

The base of the housing includes first and second annular partitions. A second annular chamber is defined by the first annular partition, the platform, the second annular partition, and the base. An opening in the platform of the central support connects the second chamber in fluid communication to the first chamber.

The housing cover has a boss projecting from the cover. The sliding element interfaces with the boss to close the bleed valve. The valve is opened by moving the sliding element toward the central support, which allows bleed air from the compressor to flow through the boss past the sliding element to a valve outlet bored through the body of the housing.

Control air from an engine source flows through a first bore in the housing to the second chamber. The second chamber is vented to ambient via a second bore in the housing. The first and second bores have a primary and secondary metering orifice that regulate the flow of air through the second chamber. The size of the primary and secondary metering orifices are selected such that the pressure in the first and second chambers is greater than the bleed air pressure at the boss at a certain control air pressure, thereby forcing the sliding element to mate with the boss to shut off the flow of bleed air to the valve outlet and allowing the control air to flow through the second chamber and vent to ambient through the second bore without flowing into the first chamber.

The valve opens by decreasing the control air pressure such that the pressure in the first and second chambers is below the bleed air pressure at the boss, which allows the bleed air pressure to force the sliding element to move along the guide column toward the central support. As the sliding element moves along the guide column toward the central support, bleed air flows through the boss around the sliding element to the valve outlet while air in the first chamber flows into the second chamber and vents to ambient through the second bore.

The valve closes by increasing the control air pressure such that the pressure in the first and second chambers is above the bleed air pressure at the boss. As the pressure in the second and first chambers rises above the bleed air pressure at the boss, air flows from the second chamber to the first chamber forcing the sliding element to mate with the boss, thereby shutting off the flow of bleed air to the valve outlet.

The bleed valve as described above reduces the effect of control air contamination on valve performance because the control air flows through the second chamber of the valve and vents to ambient when the valve is closed, thereby allowing control air contamination to pass through the valve, diverted away from the first and second surfaces and sliding seal. When the valve is closing and control air flows from the second chamber into the first chamber, control air contamination may settle onto the first and second surfaces and sliding seal, however the chance of control air contamination settling onto the first and second surfaces and sliding seal is reduced because the control air contamination passes through the valve when the valve is closed.

The bleed valve may also be disposed on the underside of the gas turbine engine in order to utilize gravity to keep control air contamination from flowing from the second chamber into the first chamber and settling onto the first and second surfaces and sliding seal, and to keep bleed air contamination from settling onto the first and second surfaces and sliding seal.

Other objects, features, and advantages of the invention will become apparent in light of the following description thereof.

BEST MODE FOR CARRYING OUT THE INVENTION

Figure 1:
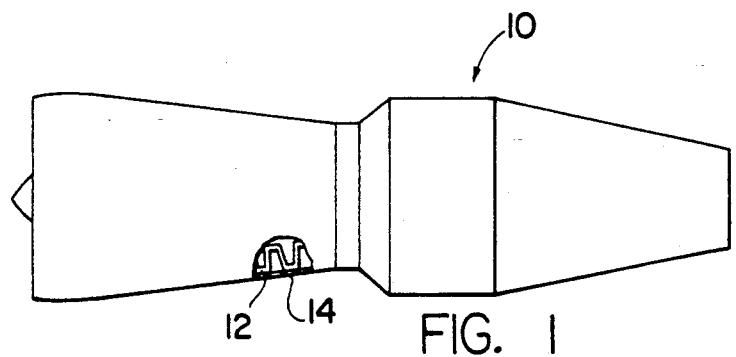
FIG. 1 is a partially cutaway elevational view of the exterior of a gas turbine engine.
Figure 2:
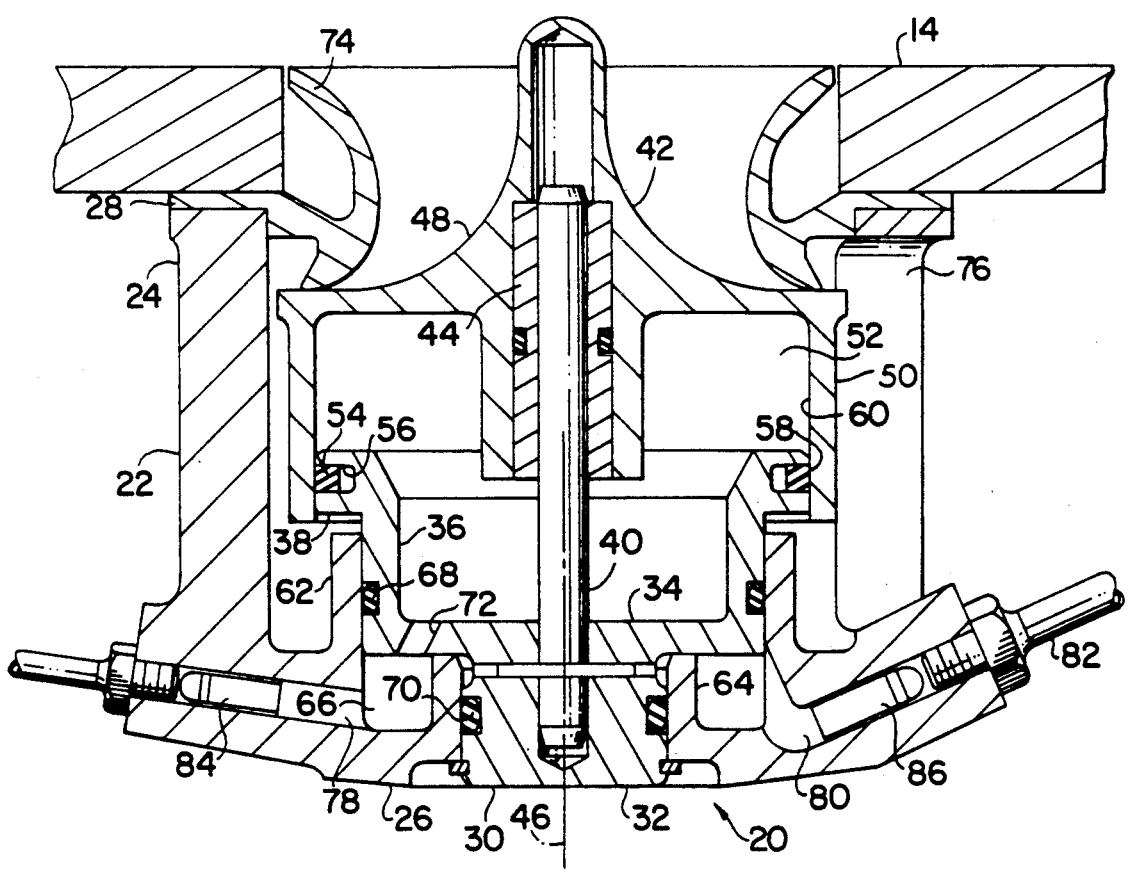
FIG. 2 is a sectional elevational view of a bleed valve according to the present invention.

Referring to FIG. 1, a gas turbine engine 10 incorporates a compressor 12 housed in an engine casing 14. Referring to FIG. 2, a sleeve type bleed valve 20 is affixed to the engine casing 14 to provide a regulated source of high pressure compressor air for use in accessories such as starters and pneumatic valves. The bleed valve 20 includes a housing 22 having a cylindrical body 24 joined to a circular base 26 and further to a circular cover 28. The base 26 of the housing 22 is coupled to an annular central support 30. The central support 30 includes a plug 32 joined to a circular platform 34 which is joined further to an annular branch 36 with an annular end 38. A guide column 40 extends from the plug 32 and circular platform 34 of the central support 30. A sliding element 42 affixed to a bushing 44 moves along the guide column 40 allowing the sliding element 42 to reciprocate along an axis 46.

The sliding element 42 has a circular head 48 and an annular wall 50 protruding from the head 48. A first annular chamber 52 defined by the wall 50, the head 48, and the central support 30 has a volume dependent upon the relative position of the sliding element 42 to the central support 30. An annular sliding seal 54 seated in a groove 56 of a first cylindrical surface 58 of the end 38 facing radially outward with respect to axis 46 interfaces with a second cylindrical surface 60 of the wall 50 facing radially inward with respect to axis 46 to seal the first chamber 52.

The base 26 of the housing 22 includes first and second annular partitions 62,64 protruding from the base 26. A second annular chamber 66 is defined by the first partition 62, the platform 34, the second partition 64, and the base 26. A first O-ring 68 between the annular branch 36 and the first partition 62 and second o-ring 70 between the plug 32 and the second partition 64 seals the second chamber 66. An opening 72 through the platform 34 connects the second chamber 66 in fluid communication to the first chamber 52.

The cover 28 of the housing 22 has a boss 74 projecting from the cover 28. The valve 20 is closed by moving the head 48 of the sliding element 42 into contact with the boss 74. The valve 20 is opened by moving the sliding element 42 toward the central support 30, which allows bleed air from the compressor to flow through the boss 74 past the sliding element 42 to a valve outlet 76 bored through the body 24 of the housing 22.

Control air supplied from an engine source (not shown) flows through a first bore 78 in the housing 22 into the second camber 66. A second bore 80 in the housing 22 vents the second chamber 66 to ambient (not shown) via conduit 82. The first and second bores 78,80 have a primary and secondary metering orifice 84,86 that regulate the flow of control air through the second chamber 66. The size of the primary and secondary metering orifices 84,86 are selected such that the pressure in the first and second chambers 52,66 is greater than the bleed air pressure at the boss 74 at a certain control air pressure, thereby forcing the sliding element 42 to mate with the boss 74 to shut off the flow of bleed air to the valve outlet 76 and allowing the control air to flow through the second chamber 66 and vent to ambient without flowing into the first chamber 52.

To open the valve 20 and allow bleed air to flow to the valve outlet 76, the control air pressure is decreased such that the pressure in the first and second chambers 52,66 falls below the bleed air pressure at the boss 74, allowing the bleed air pressure to force the sliding element 42 to move along the guide column 40 toward the platform 34 and plug 32 of the central support 30. As the sliding element 42 moves along the guide column 40 toward the platform 34 and plug 32, bleed air flows through the boss 74 around the sliding element 42 to the valve outlet 76 while air in the first chamber 52 flows into the second chamber 66 and vents to ambient through the second bore 80.

To close the open valve 20, the control air pressure is increased such that the pressure in the first and second chambers 52,66 is above the bleed air pressure at the boss 74. As the pressure in the second and first chambers 52,66 rises above the bleed air pressure at the boss 74, air flows from the second chamber 66 into the first chamber 52 forcing the sliding element 42 to mate with the boss 74, thereby shutting off the flow of bleed air to the valve outlet 76.

The bleed valve 20 as described above reduces the effect of control air contamination on valve performance because the control air flows through the second chamber 66 and vents to ambient when the valve 20 is closed, thereby allowing control air contamination to pass through the valve 20, diverted away from the first and second surfaces 58,60 and sliding seal 54. When the valve 20 is closing and control air flows from the second chamber 66 into the first chamber 52, control air contamination may settle onto the first and second surfaces 58,60 and sliding seal 54, however the chance of control air contamination settling onto the first and second surfaces 58,60 and sliding seal 54 is reduced because the control air contamination passes through the valve 20 when the valve 20 is closed.

The bleed valve 20 may also be disposed on the underside of the gas turbine engine 10 in order to utilize gravity to keep control air contamination from flowing from the second chamber 66 into the first chamber 52 and settling onto the first and second surfaces 58,60 and sliding seal 54, and to keep bleed air contamination from settling onto the first and second surfaces 58,60 and sliding seal 54.

Although the invention has been described above as being used to bleed the compressor 12 of a gas turbine engine 10, the valve 20 may be used to bleed any compressed volume of fluid.

Although the invention has been shown and described with respect to a particular embodiment thereof, it should be understood by those skilled in the art that the foregoing and various other changes, omissions, and additions in the form and detail thereof may be made therein without departing from the spirit and scope of the invention.

I claim:

1. A bleed valve for a compressed volume characterized by:

a housing coupled to an annular central support;

a reciprocating sliding element having a circular head joined to an annular wall;

an annular variable volume first chamber defined by said wall, said head, and said central support;

a means for sealing said first chamber;

an annular fixed volume second chamber defined by said central support and said housing;

a means for sealing said second chamber;

an opening connecting said first chamber in fluid communication to said second chamber;

a first bore through said housing connecting said second chamber in fluid communication to a source of control air;

a second bore through said housing connecting said second chamber in fluid communication to ambient art;

a primary metering orifice within said first bore; and a secondary metering orifice within said second bore.

2. The bleed valve as recited in claim 1 wherein:

said central support is further defined by a circular platform joined to an annular branch having an annular end;

said housing is further defined by a cylindrical body joined to a circular base with first and second annular partitions protruding from said base.

3. The bleed valve as recited in claim 1 wherein:

said central support is further defined by a circular platform joined to an annular branch having an annular end, said annular end of said central support having a first cylindrical surface facing radially outward with respect to the reciprocating axis; and said annular wall of said sliding element is further defined by a second cylindrical surface facing radially inward with respect to the reciprocating axis, said second surface of said wall abutting said first surface of said end.

* * * * *